Patented July 9, 1929.

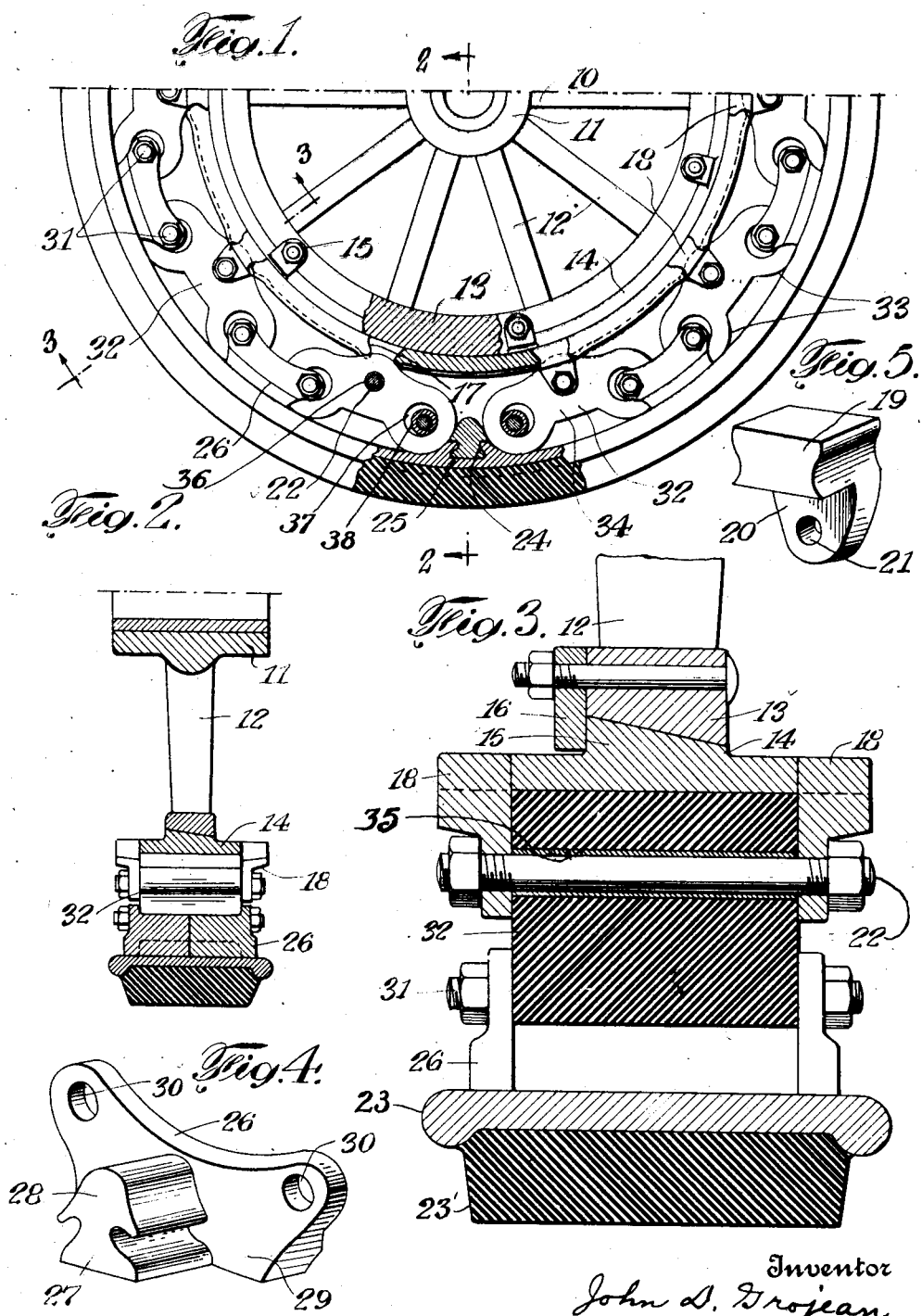

1,720,049

UNITED STATES PATENT OFFICE.

JOHN D. GROJEAN, OF NEW YORK, N. Y.

RESILIENT WHEEL.

Application filed December 16, 1927. Serial No. 240,403.

The present invention relates to resilient wheels and, more particularly, to a wheel having an outer rim spaced from the main portion of the wheel by resilient cushioning members. At the present time most resilient wheels are equipped with pneumatic tires but, while these tires reduce road shocks, they are subject to punctures and disintegration, often becoming useless when on road trips or at points remote from repair stations. Numerous substitutes for pneumatic tires have been suggested; however, due to the material from which they are made or the complicated arrangements of their constituent parts, few of them have attained any degree of success.

The present invention is designed to eliminate objectionable features common to substitutes for pneumatic tires, the cushioning members employed being especially designed to absorb road shocks and secured to the wheel in such a manner as to be readily and easily assembled or replaced. The invention contemplates the use of detachable cushions, secured to the main portion of the wheel and to the rim, to be separately detachable without making it necessary to remove other parts of the wheel or remove the wheel itself from the vehicle to which it is attached.

The invention will be more fully understood from the following description taken in connection with the accompanying drawings illustrating a preferred form of the invention, and in which:

Figure 1 is a side view, partly in section, of a portion of the wheel;

Fig. 2 is a sectional view taken on a line 2—2 of Figure 1;

Figure 3 is a sectional view on a larger scale taken on a line 3—3 of Figure 1;

Figure 4 is a perspective view of a spacing and clamping member; and

Figure 5 is a perspective view of one member of the means for attaching the cushion to the inner rim.

As shown in the drawings, the wheel 10 comprises the usual hub 11 and spokes 12 to which is secured a felloe 13. An inner rim 14 is detachably secured to the felloe, being held thereon by means of the wedge-shaped flange 15 and lugs 16 in the usual manner. At suitably spaced intervals the periphery of the rim 14 is provided, at each side thereof, with transverse dove-tailed grooves or slots 17 with which clamping members 18 engage, there being a series of these clamping members on each side of the wheel, corresponding in number to the grooves 17. As shown in Figure 5, each clamping member consists of a head portion 19, substantially trapezoidal in cross-section, designed to form a relatively close fit in the groove 17. Depending from the head portion 19 is a flange portion 20 provided with an aperture 21 thru which clamping bolts 22 pass to hold each pair of members 18 in clamping relation.

The outer rim 23 has a diameter somewhat larger than that of the inner rim 14 and has formed on its inner periphery a series of flanges 24 arranged in oppositely disposed pairs to form grooves 25. Cooperating with the grooves 25 is a series of removable fastening lugs 26, each of which consists of a dove-tailed portion 27 formed integrally with a spacer portion 28 and a clamping flange 29, the latter of which is apertured at 30 to accommodate the clamping bolts 31. A solid rubber tire 23' is molded on the outer periphery of the rim 23 to provide traction.

Secured to and clamped between the members 18 and 26, by means of the bolts 22 and 31, is a series of resilient cushion members 32, designed to space the outer rim from the inner rim but permit radial movement relative thereto. Each cushion comprises substantially cylindrical apertured end portions 33 and a connectiong portion 34, the whole forming an arch shaped resilient cushioning member. These cushions are preferably molded from rubber having sufficient resiliency to absorb the shocks incident to road travel, yet having sufficient rigidity to withstand wear. Each cushion is attached to the inner rim by a bolt 22, the aperture 35 in the connecting portion 34 having a diameter substantially equal to that of the bushing 36 on the bolt 22 so that a relatively rigid connection between each cushion and the inner rim is maintained. The apertures 37 in the end portions of the cushions are somewhat larger than the bushing 38 on the bolt 31 to permit relative movement of the cushion with respect to the bolts, this play being necessary in view of the distortion of the cushions when loaded. It will be seen that the spacer portions 28 of the clamps 26 act as buffers as well as spacers, the cushions when spreading under load riding against the spacers. From the above description it will be seen that the cushions are rigidly connected to the inner rim and connected to the outer rim in such a manner that they support the inner rim by sustaining the load at the arched top of the cushion. The ends of the cushion are permitted to spread and allow the two rims to approach each other radially of the hub of the wheel. The clamping members also grip the cushioning members to prevent lateral movement of the outer rim with respect to the main body of the wheel.

The clamping members are symmetrical in shape and may be applied to either side of the wheel. Each set of clamps and each cushion is readily detachable from the wheel, making it possible to remove any particular cushion without disturbing the remaining cushions. There is no contact between relatively movable metal parts, so that it is unnecessary to lubricate the resilient connections between the inner and outer rims; there is, therefore, no danger of the cushions deteriorating on account of oil coming in contact with them. If necessary, those portions of the cushions subjected to friction and wear may be reinforced with fabric. Since the several cushioning and clamping units are relatively inexpensive, a few spare parts for replacement purposes may be carried and the usual spare tire or spare wheel dispensed with.

While a preferred form of the invention has been described in detail, it is obvious that the invention is subject to modification and is, therefore, not limited to the exact construction described above, but is to be construed in the light of the prior art and according to the scope of the appended claims.

What I claim is:

1. A wheel of the class described comprising an inner rim, an outer rim, a plurality of resilient members interposed between said rims, said members each comprising an arched body portion and rounded ends therefor, fastening elements associated with the inner rim, means for securing each of said resilient members intermediate its ends to a corresponding fastening element, fastening elements associated with the outer rim, and means for securing the rounded ends of the resilient members to corresponding fastening elements of the outer rim in relative sliding engagement therewith.

2. A member for use with wheels comprising an arched body portion of resilient material having an intermediate transverse opening and rounded ends therefor, said rounded ends having transverse openings.

3. A wheel of the class described comprising an inner rim, an outer rim, a plurality of resilient members interposed between said rims, said members each comprising an arched body portion and rounded ends therefor and having an intermediate transverse opening in the arched body portion and transverse openings in the rounded ends, elements associated with the inner and outer rims, said elements having flanges with transverse openings, and fastening members extending through the transverse openings of the flanges and resilient members for assembling the parts in service, the arched body portions being centrally attached to the inner rim and the rounded ends attached to the outer rim by said fastening members.

In testimony whereof, I have signed my name to this specification this 15th day of December, 1927.

JOHN D. GROJEAN.